(No Model.)

H. C. BENDER.
SHIP'S PROPELLER.

No. 334,632. Patented Jan. 19, 1886.

WITNESSES:
A. P. Grant,
W. F. Kircher

INVENTOR:
Henry C. Bender
BY
ATTORNEY.

UNITED STATES PATENT OFFICE.

HENRY C. BENDER, OF MONTGOMERYVILLE, PENNSYLVANIA.

SHIP'S PROPELLER.

SPECIFICATION forming part of Letters Patent No. 334,632, dated January 19, 1886.

Application filed April 11, 1885. Serial No. 161,914. (No model.)

*To all whom it may concern:*

Be it known that I, HENRY C. BENDER, a citizen of the United States, residing at Montgomeryville, in the county of Montgomery, State of Pennsylvania, have invented a new and useful Improvement in Ships' Propellers, which improvement is fully set forth in the following specification and accompanying drawings, in which—

Figure 1:
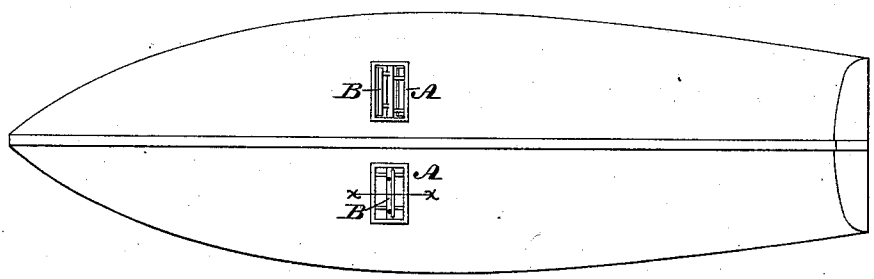
Figure 2:
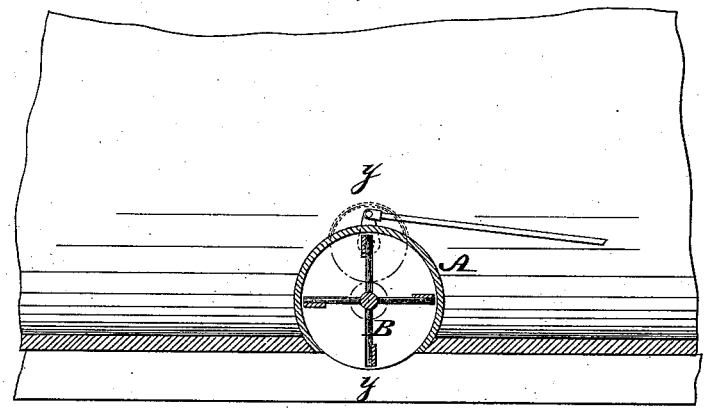
Figure 3:
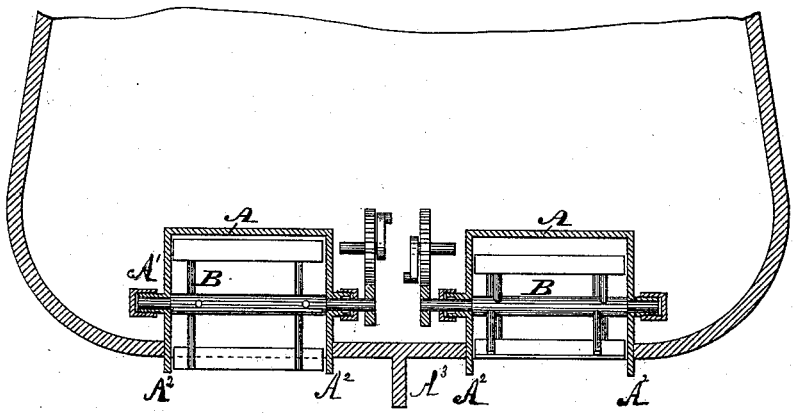

Figure 1 represents a bottom plan view of a ships' propeller embodying my invention. Fig. 2 is a section thereof in line $x\ x$, Fig. 1. Fig. 3 represents a transverse section thereof in line $y\ y$, Fig. 2.

Similar letters of reference indicate corresponding parts in the several figures.

My invention consists of propellers or paddle-wheels located in chambers in the bottom of the hull of a ship, the operation of the propeller being effective, there being no loss of power, no material agitation of the water, and no noise perceptible from above.

Referring to the drawings, A represents horizontally-arranged chambers in which the propellers or paddle-wheels B are mounted, said chambers being on opposite sides of the keel, of the form of sections of cylinders, the open portions of which are below, and thus in communication with the water, and the closed portions are within the hull of the vessel. The heads or ends of the chambers form bearings for the shafts of the propellers, and have suitable stuffing-boxes for said shafts, power being communicated to the latter in any suitable manner. The sides A' of each chamber, house, or case A extend below the bottom line of the hull, forming guards $A^2$ and leaving passages $A^3\ A^3$. By this provision the back-draft of water at the sides of the bottom of the hull, and particularly around the keel, is directed in the main through the passages $A^3$, and the wheels B are not materially affected by said draft, and thus operate more effectively on the water. The opening in the bottom of each case is about equal in the present instance to a quarter of a circle described by the wheel, and the latter has four blades, whereby but one blade enters said opening at a time, and each blade fully leaves the opening before the next blade enters the same, there thus being no resistance to the water by having two or more blades entering the water at the same time. A blade after being in action re-enters the case just as the next blade leaves the same and begins its action. It will be seen that the wheels rotate within the chambers A, and their blades enter the water below the bottom line of the hull. The propellers act effectively and prevent any material agitation of the water. They are also arranged so that they are not exposed to floating objects, and their noise cannot be heard. Furthermore, the chambers A are closed, excepting where they communicate with the water, and prevented from leakage.

I am aware that it is old to attach cases containing wheels to the sides of a vessel and to inclose the same with timbers conforming to the shape of the vessel, and such I do not claim.

Having thus described my invention, what I claim as new, and desire to secure by Letters Patent, is—

1. A ship's hull having a cylindrical-shaped wheel-case on each side of the keel, said cases having both their inner and outer sides extending below the bottom of the hull, substantially as and for the purpose set forth.

2. A wheel-case having its bottom provided with an opening about equal to the distance between adjacent blades of the wheel, and its inner and outer sides extending below the bottom of the hull, substantially as and for the purpose set forth.

H. C. BENDER.

Witnesses:
JOHN A. WIEDERSHEIM,
DANIEL STEINMETZ, Jr.